Nov. 17, 1970 W. C. DOYLE ET AL 3,541,258

CONFERENCE COMMUNICATION SYSTEM WITH INDEPENDENT VARIABLE AMPLIFICATION OF SIDETONE AND CONFEREE SIGNALS

Filed May 29, 1967 2 Sheets-Sheet 1

INVENTORS
WILLIAM C. DOYLE
EDMUND T. WRIGHT

BY John F. Lawler

ATTORNEY

INVENTORS
WILLIAM C. DOYLE
EDMUND T. WRIGHT
BY John F Lawler
ATTORNEY

United States Patent Office 3,541,258
Patented Nov. 17, 1970

3,541,258
CONFERENCE COMMUNICATION SYSTEM WITH INDEPENDENT VARIABLE AMPLIFICATION OF SIDETONE AND CONFEREE SIGNALS

William C. Doyle, Los Altos, and Edmund T. Wright, Palo Alto, Calif., assignors to Sylvania Electric Products Inc., a corporation of Delaware

Filed May 29, 1967, Ser. No. 641,761
Int. Cl. H04m *1/68*
U.S. Cl. 179—1 1 Claim

ABSTRACT OF THE DISCLOSURE

The system comprises several interconnected telephones, one for each conferee, disposed in one room and interconnected for conference communication between the conferees. Each headset contains a sidetone amplifier which amplifies the speaker's voice and applies the resulting signal to the speaker's earpiece, inducing him to lower his voice. During a secure conference, a sound reproducer directs prerecorded unclassified voice sounds of the conferees into the room to mask the conference.

BACKGROUND OF INVENTION

This invention relates to an improved conference communication system for maintaining the security of communications of conferees.

The use of clandestine surveillance devices (bugs) for surreptitiously monitoring conversations is described in an article entitled "Electronic Eavesdropping," by R. M. Brown, Electronics World, April 1967. Detection and elimination of bugs has become more difficult with the advent of microminiaturized components and more sophisticated and advanced techniques. Since detection of all bugs in a conference room may be impracticable, one method of rendering them ineffective is to prevent a usable signal from reaching the surveillance device. A technique proposed for accomplishing this result is disclosed in Pat. 3,229,429. It consists of enclosing a special conference room within another room and filling the intermediate space with acoustic insulation for masking sounds. However, such an arrangement is not only costly to construct but is immovable.

Business and other organizations often find it necessary to hold sensitive conferences away from areas under their exclusive control, such as in hotel rooms and the like, and thus have a greater risk that the conference room may be bugged. To maintain security under these circumstances, it is desirable to have a portable conference communications system which cannot be monitored by eavesdropping devices in the conference room. This invention is directed toward the provision of such a system.

SUMMARY OF INVENTION

In accordance with this invention, several conferees in a room talk with each other by hardline connections between telephone headsets worn by each conferee who is induced to lower the volume of his voice by sidetone amplification of his own voice fed back to his ear. This greatly reduces the amplitude of speech waves generated by conferees in the room. A tape recorder or phonograph in the room reproduces prerecorded unclassified conference-type conversations, preferably the voices of the present conferees, at a sufficiently high volume to completely mask the low volume conversations of the conferees.

An object of this invention is the provision of a system for enabling conferees to conduct a secure conference in a room that contains clandestine listening devices.

DESCRIPTION OF DRAWINGS

This invention will be more fully understood from the following detailed description of a preferred embodiment thereof, together with the accompanying drawings in which.

DESCRIPTION OF PREFERRED EMBODIMENT

Figure 1:
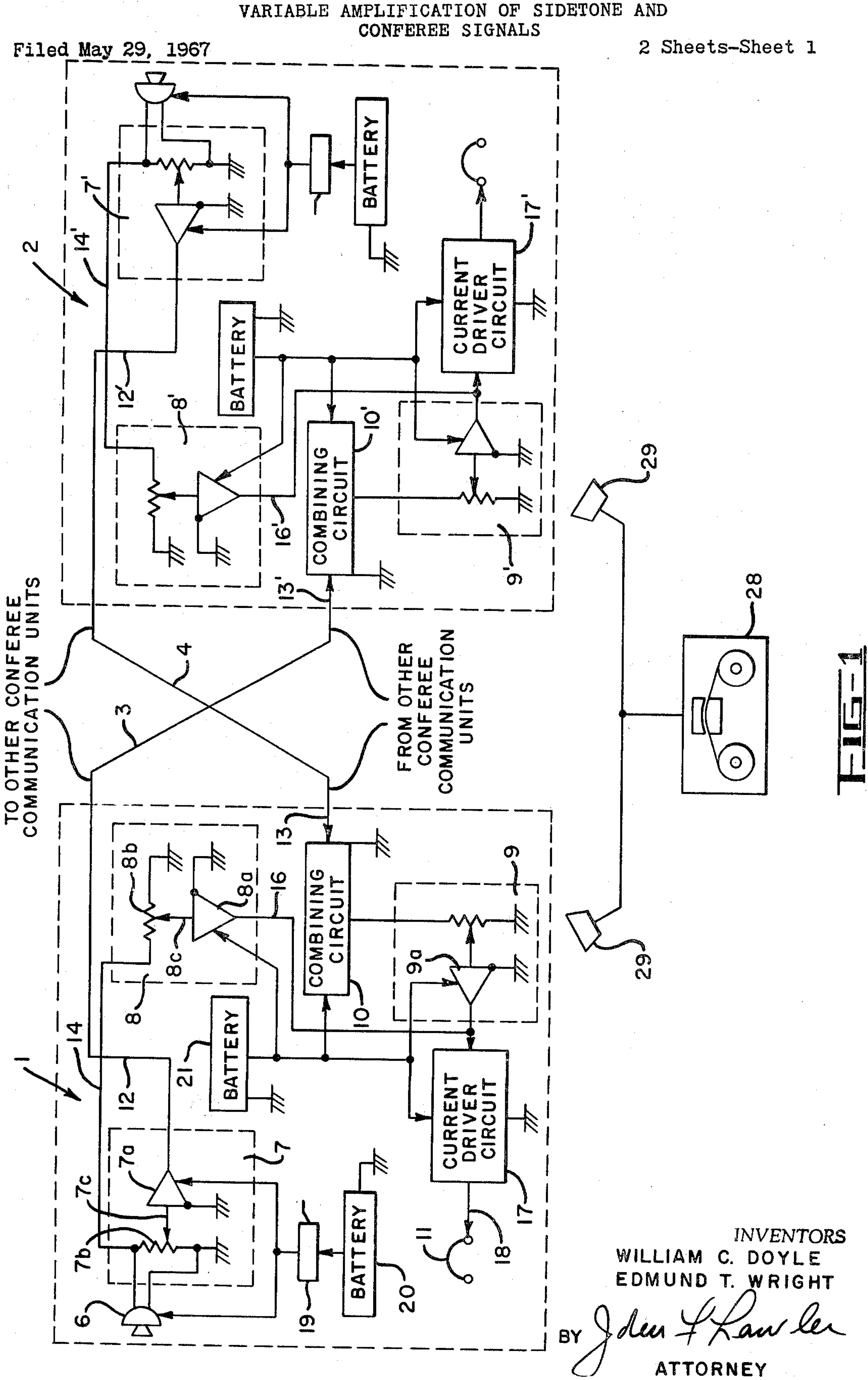
FIG. 1 is a schematic block diagram of a conference communication system embodying this invention.

Referring now to FIG. 1, this invention comprises a plurality of conferee communication units, such as units 1 and 2, which are interconnected by coaxial transmission lines 3 and 4. Since the units are identical, only conferee communication unit 1 will be described in detail.

Each conferee communication unit comprises a microphone 6, variable gain amplifier circuits 7, 8, and 9, combining circuit 10, and earphones 11. In order to provide maximum efficiency in picking up voice signals of a conferee and minimum discomfort of and interference with conferees, microphone 6 is preferably a cranial microphone which senses voice signals of the wearer through vibrations in his skull. Alternatively, the microphone may be a throat or a muzzle-type which, however, are less comfortable for the conferees.

Variable gain amplifier circuit 7 comprises amplifier **7*a* and potentiometer 7*b*. The potentiometer is connected across the output of the microphone. A movable arm 7*c* of the potentiometer is connected to amplifier 7*a* for varying the gain thereof. Amplifier circuits 8 and 9 are similar to circuit 7. The output of amplifier circuit 7 on line 12 is the output of unit 1 that is connected through line 3 to the first input on line 13′ to combining circuit 10′ of the other conferee communication unit 2. Similarly, the output of amplifier circuit 7′ of unit 2 is connected through line 4 and line 13 to combining circuit 10**. The combining circuit may, by way of example, be a summing amplifier.

The output of the microphone is connected on line 14 to amplifier circuit 8. The output of circuit 8 on line 16 is connected to the input to current driver 17. The output of circuit 10 is amplified by circuit 9 and is also applied to current driver 17. Circuit 17 converts input signals to current signals that are applied on line 18 to drive the loudspeakers of earphones 11.

In a portable secure conference communication system, microphone 6 is energized through a switch 19 by a battery 20. Amplifiers **7*a*, 8*a*, and 9*a*, combining circuit 10 and current driver 17 are energized by battery 21**.

Figure 2:
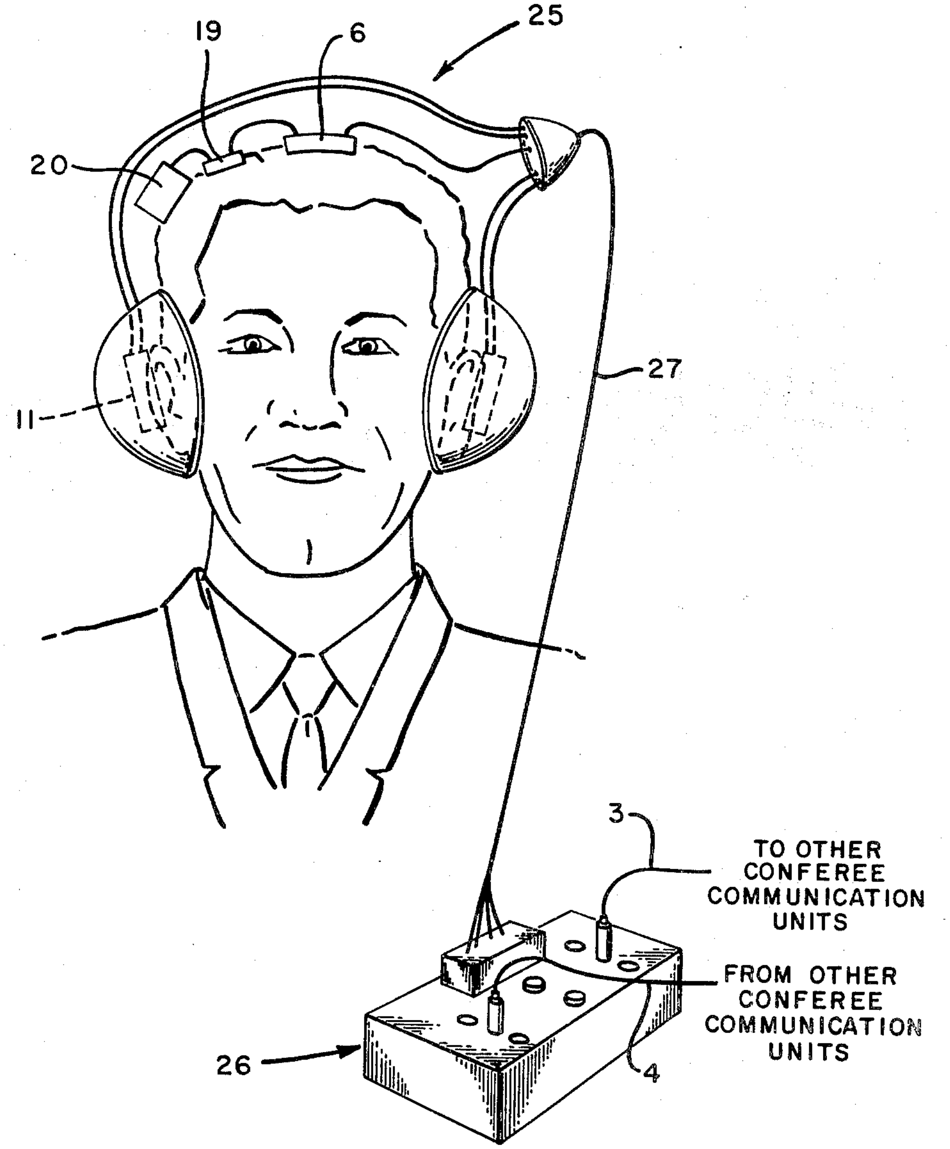
FIG. 2 is a perspective view of a conferee utilizing equipment embodying the invention of FIG. 1.

Referring now to FIG. 2, equipment embodying conferee communication unit 1 comprises headset 25 and connection box 26. Headset 25 comprises microphone 6, earphones 11, microswitch 19, and battery 20. The microphone is a cranial microphone which contacts and receives voice signals transmitted through the skull of the conferee. The microphone is energized by battery 20 when microswitch 19 makes contact with the head of the conferee.

Connection box 26 contains amplifier circuits 7, 8, and 9, combining circuit 10, current driver 17, and battery 21. The output of the microphone 6 is coupled to and the output of current driver 17 on line 18 is coupled from connection box 26 through coaxial cable 27.

The output of conferee communication unit 1 to the other conferee communication units 2 is coupled from connection box 26 on line 3. The input to conferee communication unit 1 from the other conferee communication unit 2 is coupled through line 4 to the connection box.

In operation, battery 20 energizes microphone 6 when headset 25 is positioned on the conferee such that microswitch 19 is actuated by contact with the head of the conferee. Voice signals generated by the conferee are picked up and detected by the cranial microphone 6 and are amplified by circuits 7 and 8. The amplified signal on line 16 and signals from the other conferees (unit 2) on line 13 (line 4) are converted to a current signal which drives earphones 11. Thus, the conferee hears his own voice signal as well as the voices of other conferees. The magnitude of a particular conferee's voice signal heard by the other conferees may be changed by varying the gain of amplifier 7. The magnitude of other conferees' voice signals heard by a particular conferee may be changed by varying the gain of the amplifier 9 in the communication unit associated with that particular conferee.

In order to block or substantially interfere with reception of present conference conversation by surveillance devices in the conference room, means are provided to induce the conferees to speak very softly. This is accomplished in accordance with this invention by amplifying that portion of the voice signal of each conferee that is applied to his own earphones. The degree of amplification is such that the speaker's voice is to him considerably louder than with normal telephone usage. The effect is that the speaker compensates by lowering his voice. In the embodiment of this invention illustrated in FIG. 1, this effect is accomplished by adjusting the arm **8*c* of potentiometer 8*b* such that amplification of circuit 8, and thus the level of voice signals applied to the ear of the associated conferee, is sufficient to cause the conferee to speak softly. Thus, microphone 6, amplifier circuit 8, and earphones 11** comprise a circuit for controlling the level of the voice signal of a conferee.

In order more completely to mask and thus to prevent reception of low level voice signals in the conference room, a jamming signal is produced or generated in the conference room. For this purpose, a tape recorder 28, see FIG. 1, drives a plurality of loudspeakers 29 located in the conference room. The jamming signal comprises a plurality of voice signals or conversations recorded simultaneously on magnetic tape. The voice signals contain frequency components of the voice signals of conferees. The jamming signal preferably is a reproduction of actual voice signals of the individual conferees recorded previously. Effective interference with present voice signals is accomplished by producing a jamming signal in the conference room that is approximately 20 db greater than the present voice level of conferees.

Although the above description is directed to a preferred embodiment of the invention, modifications and improvements will be apparent to those skilled in the art wtihout departing from the scope of the invention. For example, optical devices for transmitting signals between conferees could be substituted for the coaxial transmission lines 3 and 4 in FIG. 1. Alternatively, voice signals of the conferees could be encrypted and relayed to other conferees by conventional radio frequency transmission techniques. The scope of this invention is therefore to be determined from the appended claims rather than from the above-detailed description.

What is claimed is:

1. A secure conference communications system comprising a pluraltiy of interconnected conferee units providing transmitting and receiving paths for conference-type conversation between all conferees, each of said units comprising an acousto-electric transducer responsive only to the voice of the associated conferee, a first variable gain audio amplifier connected to an output of said acousto-electric transducer for varying the amplitude of only the signals from the associated unit, an electro-acoustic transducer connected to the output of said first amplifier, a terminal junction having a plurality of inputs and having an output, means for connecting the inputs of the terminal junction of each of said units to outputs, respectively, of the acousto-electric transducers of the other units, a second variable gain amplifier electrically connected in series between an output of said acousto-electric transducer and the associated inputs of said terminal junctions of the other units for controlling the amplitude of only those signals from the associated unit, and a third variable gain amplifier electrically connected in series between the output of said terminal junction and said electro-acoustic transducer for controlling the amplitude of only those signals from said other units.

References Cited

UNITED STATES PATENTS

| | | | |
|---|---|---|---|
| 3,060,265 | 10/1962 | Duncan et al. | 179—1 |
| 3,213,199 | 10/1965 | Snow | 179—1.5 |

CATHLEEN H. CLAFFY, Primary Examiner

J. S. BLACK, Assistant Examiner

U.S. Cl. X.R.

179—1.5